US007052541B2

(12) United States Patent
Chianelli et al.

(10) Patent No.: US 7,052,541 B2
(45) Date of Patent: May 30, 2006

(54) COLOR COMPOSITIONS

(75) Inventors: Russell Chianelli, El Paso, TX (US); Lori A. Polette, El Paso, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 246 days.

(21) Appl. No.: 10/370,288

(22) Filed: Feb. 18, 2003

(65) Prior Publication Data

US 2004/0011254 A1 Jan. 22, 2004

Related U.S. Application Data

(60) Provisional application No. 60/390,049, filed on Jun. 19, 2002.

(51) Int. Cl.
*C09B 7/00* (2006.01)

(52) U.S. Cl. .......................... 106/401; 106/487; 534/15; 548/457

(58) Field of Classification Search .................. 106/401, 106/487; 534/15; 548/457
See application file for complete search history.

(56) References Cited

U.S. PATENT DOCUMENTS

| | | | |
|---|---|---|---|
| 1,058,021 A * | 4/1913 | Schmidt | 8/528 |
| 2,940,928 A * | 6/1960 | Dupzyk et al. | 508/136 |
| 3,950,180 A | 4/1976 | Kato | 106/288 |
| 4,246,036 A | 1/1981 | Anton et al. | 106/99 |
| 4,640,862 A | 2/1987 | Lakes | 428/308.4 |
| 4,868,018 A | 9/1989 | Schiffer | 428/15 |
| 4,874,433 A | 10/1989 | Kiss et al. | 106/450 |
| 5,061,290 A | 10/1991 | Koshida et al. | 8/653 |
| 5,574,081 A | 11/1996 | Kroon | 524/56 |
| 5,807,540 A | 9/1998 | Junino et al. | 424/61 |
| 5,942,285 A | 8/1999 | Schmid et al. | 427/318 |
| 5,972,049 A | 10/1999 | Wicker, Jr. et al. | 8/574 |
| 5,993,920 A | 11/1999 | Kim | 428/15 |
| 6,033,466 A | 3/2000 | Ito | 106/486 |
| 6,162,646 A | 12/2000 | Webster et al. | 436/166 |
| 6,197,849 B1 | 3/2001 | Zilg et al. | 523/216 |
| 6,200,378 B1 * | 3/2001 | Piastra et al. | 106/498 |
| 6,252,024 B1 | 6/2001 | Barnard et al. | 526/259 |
| 6,294,012 B1 | 9/2001 | Bindra | 106/496 |
| 6,303,385 B1 | 10/2001 | Barnard et al. | 436/163 |
| 6,323,270 B1 | 11/2001 | Ishida | 524/445 |
| 6,339,084 B1 | 1/2002 | Kaul et al. | 514/224.2 |
| 6,346,145 B1 | 2/2002 | Hen et al. | 106/486 |
| 6,402,826 B1 | 6/2002 | Yuan et al. | 106/486 |
| 2001/0012559 A1 | 8/2001 | Zambounis et al. | 428/304.4 |

OTHER PUBLICATIONS

Chemical Abstract No. 68:22756, abstract of an article by Kleber et al entitled "Study and Indentification of Maya Blue", Studies in Conservation 12(2), 41–56 (1967), [no month].*

Chemical Abstract No. 102:71547, abstract of an article by Peregrin et al entitled "Sythesis Characterization and Thermal Behavior of Some Metal Indigosulfonates", Journal of Thermal Analysis 29(3), 515–521 (1984), [no month].*

Chemical Abstract No. 113:198787, abstract of an article by Awal, Krishna Prasad entitled "Studioes on the Interaction of Acid Dyes with Some Local Clay Minerals" Journal of Nepal Chemical Society 8, 1–5 (1988), [no month].*

Chemical Abstract No. 139:198789, abstract of an article by Hubbard et al entitled "Structural Study of Maya Blue: . . . Palygorskite–Indigo and Sepiolite–Indigo Adducts" Clays and Clay Minerals 51(3) 318–326, 2003, [no month].*

"Maya paint secrets revealed," printed from the Accelrys website: www.accelrys.com/cases/maya.html, Mar. 26, 2002.

Chianelli and Martinez, "Environmental pigments," printed from the University of Texas at El Paso website: www.mrti.utep.edu/maya.htm, Mar. 26, 2002.

Gettens, "Maya blue: an unsolved problem in ancient pigments," *Amer. Antiquity*, 27:557–564, 1962, no month.

José–Yacamán et al., "Maya Blue Organic/inorganic Complex Paint: An Ancient Nanostructured Material" *Science*, 273:223–225, 1996, no month.

Littman, "Maya blue—a new perspective," *Amer. Antiquity*, 45:87–101, 1980, no month.

Littman, "Maya blue—further perspectives and the possible use of indigo as the colorant," *Amer. Antiquity*, 47:404–408, 1982, no month.

Polette and Chiannelli, "In–situ identification of palygorskite in Maya blue samples using synchrotron x–ray powder diffraction," *Workshop on Synchrotron Radiation in Art and Archaeology*, SSRL, Oct. 18, 2000.

Polette et al., "Secrets of Maya blue paint," *Discovering Arqueology*, Aug., pp. 46–53, 2000.

Torres, *Maya Blue: How the Mayas Could Have Made the Pigment, Materials Research Society Symposium* Materials Research Society, pp. 123–128, 1988.

Van Olphen, "Maya blue—a clay, organic pigment," *Science*, 154:645–646, 1966a.

* cited by examiner

*Primary Examiner*—Anthony J. Green
(74) *Attorney, Agent, or Firm*—Fulbright & Jaworski

(57) ABSTRACT

The present invention includes a paint or coating composition comprising an organic pigment or dye complexed to the surface of a layered or fibrous inorganic clay. A wide variety of paint colors can be obtained by varying the pH during the preparation as well as by varying the synthesis conditions and changing particle size of the clay. The paint has unprecedented stability.

34 Claims, 5 Drawing Sheets

(2 of 5 Drawing Sheet(s) Filed in Color)

COLOR COMPOSITIONS

This application claims benefit of priority to U.S. Provisional Application Ser. No. 60/390,049, filed Jun. 19, 2002, the entire contents of which are incorporated by reference.

The government may own rights in the present invention pursuant to GSA Strategic Metals Grant No. 26-3000-57.

BACKGROUND OF THE INVENTION

I. Field of the Invention

The present invention relates to the field of paints and more specifically provides a novel long lasting, stable powder that can be incorporated into paints, plastics, and cements.

II. Description of Related Art

In the scientific literature, the term Maya blue refers to a "turquoise" brilliant shade of blue that is found on murals and archaeological artifacts, for example, throughout Mesoamerica. It is described in the literature as being composed of palygorskite clay and indigo, that when mixed and heated, produce the stable brilliant blue color similar to that found in Mesoamerica. Any proposed methods of preparation were done for the intention of trying to replicate the blue color found at the historical sites and to reproduce the techniques employed by the original Maya.

H. Van Olphen, Rutherford Gettens, Edwin Littman, Anna Shepard, and Luis Torres, were perhaps some of the most prominently involved scientists in the examination of organic/inorganic complex paint from the 1960's to the 1980's. In the early studies, only Littman and Van Olphen published information specifically on the synthesis of organic/inorganic complex (13, 14, 9, 10). While their work never definitively described the Maya technique for making the colorant, or explained the stability of the organic/inorganic complex, the results of their two decades of studies with respect to the ancient paint laid a foundation of knowledge for future investigators.

Littman has synthesized indigo-attapulgite complexes and verified that his synthetic version was indistinguishable from the original pigments found in the pre-Hispanic murals and artifacts (9, 10). The prepared samples had the same physical and chemical characteristics as the authentic Maya blue examined. Littman concluded that the remarkable stability of the attapulgite was due to the heat treatment the attapulgite received during the synthesis. Others have also synthesized compounds similar to that of Maya blue by a number of routes (30). They employed the Gettens test to determine whether the laboratory synthesis of Maya blue was indeed authentic with the same chemical resistant properties (3). The test was necessary because initial attempts of simply mixing the palygorskite clay produced the color of Maya blue but the mixture did not possess the same chemical properties as the original organic/inorganic complex samples.

The literature for Maya paint compositions does not provide information with respect to varying the color for the paint composition based on altering the pH and particle size; nor does there appear to be mention of using alternate dye or pigment systems as described in the present invention. Formulations of paints based on the paint composition of the present invention with resins or polymeric systems have not been realized either according to the literature. The only known literature discussions of pH pertain to the alkaline pH required to reduce the indigo prior to contacting it with the clay (9, 10). Furthermore, there is a lack of understanding regarding the chemistry for producing stable and nontoxic paint systems by combining dyes and pigments with fibrous and layered clays.

Therefore, it would be advantageous to provide a novel paint composition that is stable and nontoxic.

SUMMARY OF THE INVENTION

Thus, in accordance with the present invention, there is provided a coating composition comprising (a) a molecular derivative of indigo; and (b) a fibrous or layered clay, wherein the coating composition is used for coloring surfaces. The color/hue of the composition is determined by the concentration of the dye and pH of the composition. The particle size of the coating composition may be between about 0.01 µm and 20 µm, or more particularly between about 0.1 µm and 2 µm. The fibrous clay may be selected from a palygorskite clay, a sepiolite clay, or a mixture of a palygorskite and a sepiolite clay. The layered clay may be a kaolinite, bentonite, nontronite, or mordenite clay. The molecular derivative of indigo may be dibromoindigo or thioindigo. The coating composition may be a powder or a liquid. The coating composition may be resistant to decomposition by light, acids, alkalis, and/or solvents.

In another embodiment, there is provided a composition comprising:

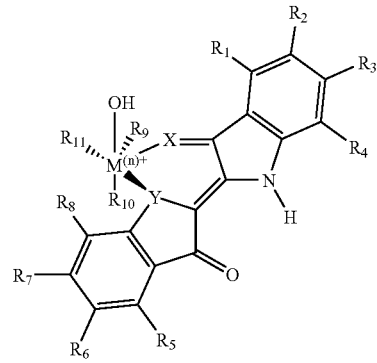

wherein $R_1$–$R_8$ are individually H, $CH_3$, $CH_2CH_3$, F, Cl, Br, I, CN, OH, SH, $OCH_3$ or $OCH_2CH_3$; $R_9$–$R_{11}$ are individually $SiO_3$, SiOH or $H_2O$; Y is N, O, S, or Se; X is O or S; $M^{(n+)}$ is Al, Sc, Ti, V, Cr, Mn, Fe, Co, Ni, Cu, Pt, Pd or Zn; and n is 1,2,3, or 4.

In yet another embodiment, there is provided a formulation comprising (a) a molecular derivative of indigo; (b) a palygorskite clay, a sepiolite clay, or a mixture of a palygorskite and a sepiolite clay; (c) a polymer; and (d) an organic binding agent.

In still yet another embodiment, there is provided a formulation comprising (a) a molecular derivative of indigo; (b) a palygorskite clay, a sepiolite clay, or a mixture of a palygorskite and a sepiolite clay; and (c) a gum arabic; a linseed oil; a copal; a polycarbonate; an egg tempura; or a turpentine.

In a further embodiment, there is provided a shapeable molding material comprising (a) a molecular derivative of indigo; (b) a palygorskite clay, a sepiolite clay, or a mixture of a palygorskite and a sepiolite clay; and (c) a cement, a plastic or a polymer.

In still a further embodiment, there is provided a shapeable tile material comprising (a) a molecular derivative of indigo; (b) a palygorskite clay, a sepiolite clay, or a mixture of a palygorskite and a sepiolite clay; and (c) a cement, a plastic or a polymer.

In still yet a further embodiment, there is provided a method of producing a coating composition comprising (a) providing a molecular derivative of indigo; (b) combining the molecular derivative of indigo with a fibrous or layered clay to form a coating composition; (c) heating the coating composition; and (d) adjusting the pH of the dye or pigment composition. The method may further comprise: (a) treating the coating composition with acid to remove impurities from the clay; (b) applying the coating composition to a surface; (c) blending the coating composition with a polymer or organic binder; or homogenizing the dye composition by blending, grinding, milling or stirring.

The heating may comprise heating at a temperature of between 100° C. and 300° C., or more particularly between 115° C. and 150° C. The heating may last up to four days. The coating composition may contain water, may have a pH between about 3 and about 7.5, may contain a dye in the range of 0.01% to 20% by weight, may contain a molecular derivative of indigo in the range of about 0.1% to 7% by weight, or more particularly by about 6% by weight at neutral or acidic pH. The fibrous clay may be a palygorskite clay, a sepiolite clay, or a mixture of a palygorskite and a sepiolite clay. The layered clay may be a kaolinite, bentonite, nontronite, or mordenite clay. The particle size of the coating composition is between about 0.01 μm and 20 μm, or more particularly between about 0.1 μm and 2 μm. The molecular derivative of indigo may be thioindigo or dibromoindigo. The method may further comprise adding a binding agent to the coating composition.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

The patent or application file contains at least one drawing executed in color. Copies of this patent or patent application publication with color drawing(s) will be provided by the office upon request and payment of the necessary fee.

DETAILED DESCRIPTION OF THE INVENTION

Figure 1:
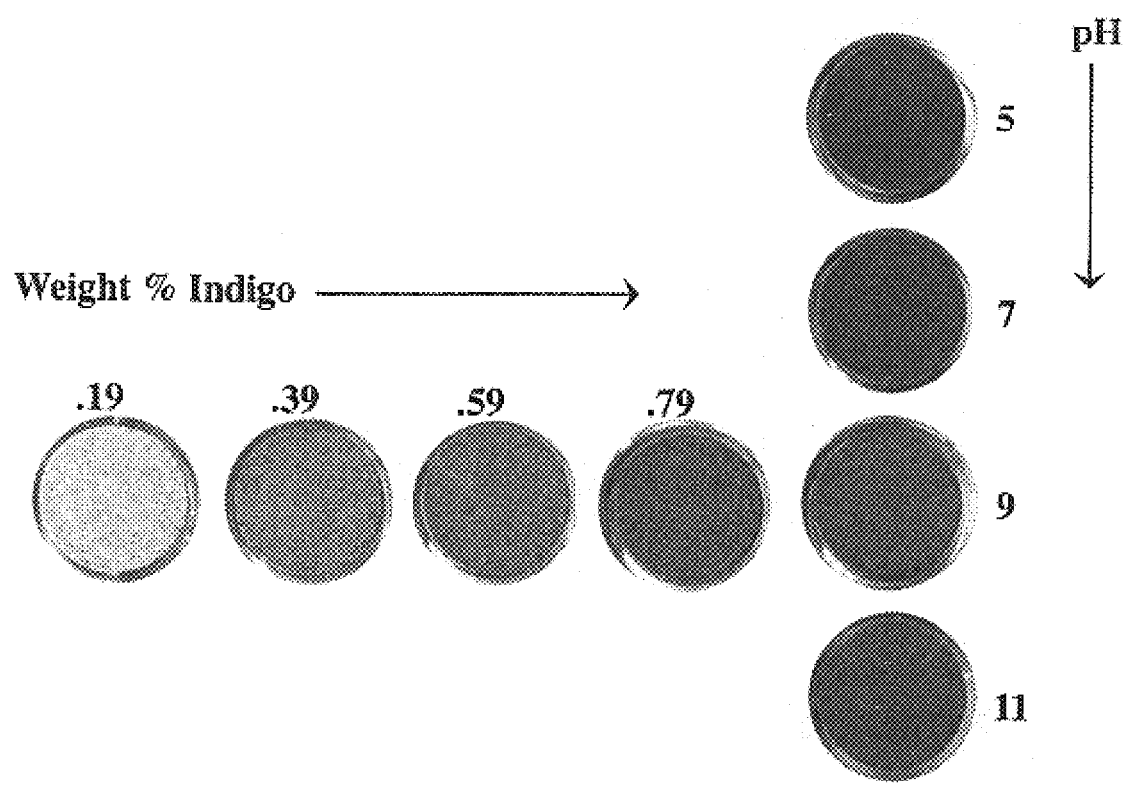
FIG. 1—Color variations of synthetic organic/inorganic complexes prepared using various concentrations of indigo derivatives. Vertically shown are the effects of pH on a synthetic sample made with 4% wt. Indigo derivatives.
Figure 2:
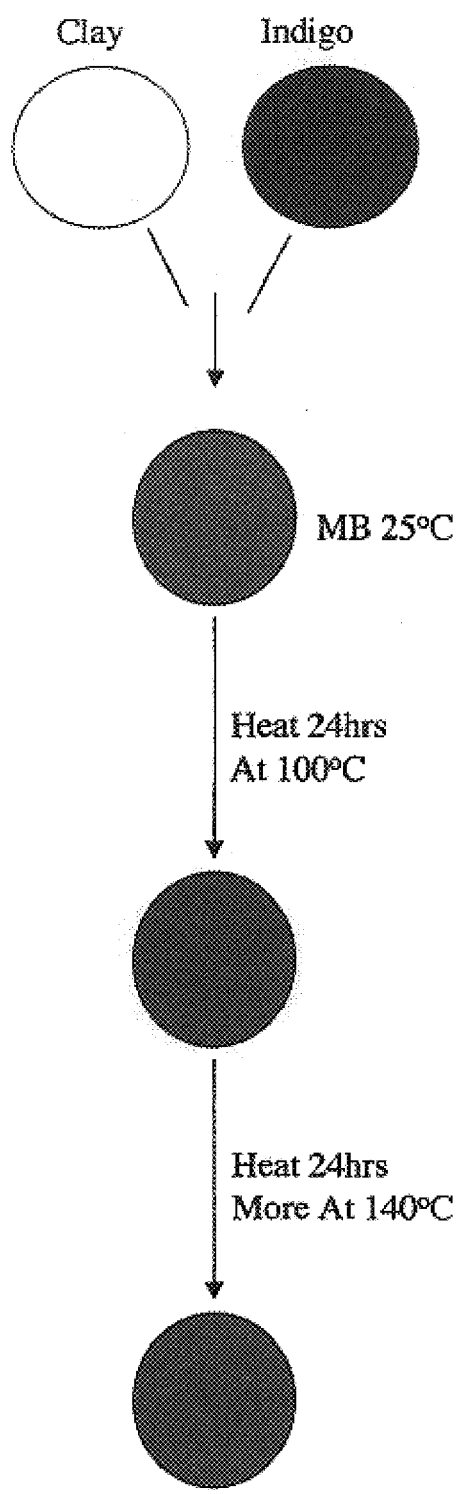
FIG. 2—Color changes as a function of temperature and heating time of synthetic organic/inorganic complexes.

The present invention includes a color composition of matter comprising organic pigments and dyes complexed to the surface of inorganic clays. These organic/inorganic hybrid materials are useful as paints and coatings for artisan and industrial purposes, as well as color compositions to be used with cements, plastics, papers and polymers. Upon grinding and heating the organic and inorganic component as solid mixtures or in aqueous solutions, the resulting color composition has unprecedented stability relative to the original starting material alone. The inorganic component is either a layered clay or a fibrous clay. The fibrous clay can be either palygorskite or sepiolite clay. The layered clay may be, for example, a kaolinite, bentonite, nontronite, or mordenite clay. The organic component is an organic dye or pigment of which some examples are found in the book Color Chemistry, $2^{nd}$ ed. (33). Using the clay with various dyes or pigments results in achieving a color composition possessing a wide variety of colors.

By changing the pH during the preparation of such color compositions control of the final composition color can be attained within any given set of clay/pigment materials. Additionally, by selecting a particular particle size of the clay starting material, a wide range of colors and hues can also be created. The color composition can be suspended in an organic binder, resins or polymers, depending on the final application. The paint powder can also be formulated with a gum arabic; a linseed oil; a copal; a polycarbonate; an egg tempura; or a turpentine, depending on the final application.

The coating composition may be applied to a surface by any of the means known in the art for paint application such as by brushing or spraying. Also, multiple shapeable materials can be formed by incorporating the color composition of the present invention in liquid, powder, or solid form, or as an emulsion with cements, plastics or polymers, to produce molding materials, tiles, concrete and other forms produced using layered or fibrous clays. The color composition can also be incorporated into portland cement concrete materials to be used as color markers on road surfaces or bridges. Some examples of portland cement concrete materials are covered in the *U.S. Department of Transportation Manual* (31) and other concrete materials are covered in *Concrete* (12). Methods of incorporating the color compositions into cement or concrete can be found in *Cement Science, In concrete Admixtures Handbook: Properties, Science, and Technology* (26).

I. Dyes

The color for the color composition comes from an organic dye or pigment. This chromophore may be a molecular derivative of indigo such as dibromoindigo or thioindigo. Other derivatives of indigo may also be used to vary the color or other physical properties of the color composition. These chromophores are shown in Scheme 1. The chromophore may also be a different derivative, such as one containing an additional conjugated ring or ligand.

Scheme 1. Possible derivatives of Indigo:

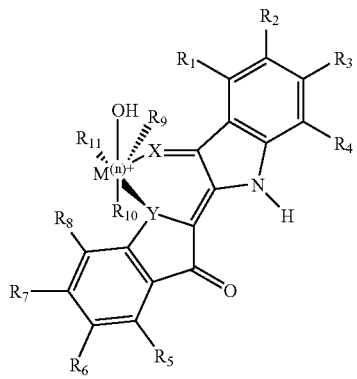

wherein $R_1$–$R_8$ are individually H, $CH_3$, $CH_2CH_3$, F, Cl, Br, I, CN, OH, SH, $OCH_3$ or $OCH_2CH_3$; $R_9$–$R_{11}$ are individually $SiO_3$, SiOH or $H_2O$; Y is N, O, S, or Se; X is O or S; $M^{(n+)}$ is Al, Sc, Ti, V, Cr, Mn, Fe, Co, Ni, Cu, Pt, Pd or Zn; and n is 1,2,3,or 4.

II. Clays

As used herein, the term "clay" refers to layered clays as well as fibrous clay. The fibrous clay is preferentially a palygorskite clay, a sepiolite clay, or a mixture of palygorskite and sepiolite clays. The mixture may be in any ratio. For example, it may be 50% palygorskite and 50% sepiolite or it may be 10%/90%, 20%/80%, 30%/70%, 40%/60%, 60%/40%, 70%/30%, 80%/20%, or 90%/10% (palygorskite/sepiolite). As used herein the term palygorskite and attapulgity are used interchangeably to refer to the same type of clay. The layered clay may be, for example, a kaolinite, bentonite, nontronite, or mordenite clay.

Previous work has shown that synthesis of comparable organic/inorganic complex paint using clays with plate-like structures, including kaolinite, bentonite, nontronite, and mordenite all produce a blue colored pigment, but without the stability of the indigo derivative/palygorskite complex (13, 14). This indicates that the possible stability of the Maya blue pigment is due to the fiber-like structure of the clays used since the use of plate-like clays had not been shown to yield a stable pigment (13, 14, 9, 10).

The particle size of the clay may be varied. It is preferentially between 0.01 μm and 20 μm, 0.05 μm and 10 μm or more preferably between 0.1 μm and 2 μm. As the color changes with the size of the particles, varying the particle size allows for greater control of color. Smaller particles will tend to be more blue in hue where the larger particles tend towards green in hue.

III. Polymers, Binding Agents and Modifiers

One or more binding agent or modifiers may be added to the paint composition to increase stability, uniformity, spreadability, adhesion, coating thickness etc. Binding agents and modifiers are well known in the art of paint formulation and may be included in the current coating composition. Binding agents such as solvent-containing binding agents (acryl, cyclized rubber, butyl rubber, hydrocarbon resin, α-methylstyrene-acrylonitrile copolymers, polyester imide, acryl acid butyl esters, polyacrylic acid esters, polyurethanes, aliphatic polyurethanes and chloro sulphonated polyethylene), and thermoplastic materials (polyolefins, α-ethylstyrene-acrylonitrile copolymers, polyester imide and polyamide) may be added to the paint composition. Similarly, polymers such as acrylate, styrene acrylate, acrylonitrile copolymer, polyethylene, polyethylene oxidate, chlorosulfonated polyethylene, ethylene-acrylic acid copolymer, methacrylate, vinylpyrrolidone-vinyl acetate copolymer, vinylidene chloride copolymer, polyvinylpyrrolidone, polyisopropyl acrylate, polyurethane, cyclized rubber, butyl rubber, hydrocarbon resin, α-methylstyrene-acrylonitrile copolymer, polyester imide, acryl acid butyl esters, or polyacrylic acid esters may be added.

The paint composition can be blended with a variety of other medium including gum arabic, linseed oil, copal, polycarbonate, egg tempura, and turpentine to create blended systems. The blended paint color can be altered depending on the medium in which it is blended. Grinding the initial powder to various particle sizes prior to or during blending with a medium can result in color control.

IV. Color Optimization

A series of experiments were developed to optimize the properties and hues of the synthetic versions of organic/inorganic complex. The synthetic versions of organic/inorganic complex were tested for stability using the Gettens test; however, the inventors have found that the Gettens test is limited and alternative methods such as IR have also been employed in these studies. Specifically, by examining the effects of dye or pigment, such as dibromoindigo, concentration, pH, and particle size, a paint possessing a color remarkably similar and stable to that of a known organic/inorganic complex was developed. The stability of the complex can be seen by its resistance to decomposition when exposed to light. Since the complex is formed with both organic and inorganic components, the stability is much higher than if only organic components were used. Based on these studies, a wide range of blues and green hues were developed as well. The present invention has established a synthetic route that can be reproduced based on the instrumental analysis that have established the chemical interactions necessary for a stable reproducible paint. This invention has led to a fundamental understanding of the complex chemical interaction between indigo derivatives and palygorskite or other types of clays.

If one wishes to reproduce a "color" that resembles another color, there are many limitations on how the two could be compared. The concept of color is only accurate if one considers that color does not exist independently of normal color vision. Spectroscopic analyses such as UV/Visible are unavailing considering that certain indigo derivatives are practically insoluble in aqueous acids and aqueous alkaline solutions. Indigo derivatives are soluble in some non-polar solvents but only in the concentration range of $10^{-5}$–$10^{-6}$ mol/L. Heating a mixture of an indigo derivative and palygorskite may indeed produce a color that 'looks' like the organic/inorganic complex seen at so many archaeological sites. But in the absence of knowing the precise quantity, conditions, and binding agents that the Maya used, the reproductions described in the literature could only be analyzed by an aesthetic visual comparison and represent different chemical techniques for producing a Maya Blue "type" organic/inorganic paint powder. The various shades of organic/inorganic complex that the inventors produced as a function of altering the concentration of indigo derivatives and the pH of the solution are shown in FIG. 1.

Early attempts at recreating Maya blue were made by first reducing indigo with sodium hydrosulfite, as shown in FIG. 1, then contacting it with clay and exposing the mixture to air (14). It was also found that heating the paint pigments at moderate temperatures caused the treated pigments to become stable to hot concentrated mineral acids, stable to acetone extraction, and stable to color change when exposed to heat (250° C.) (13, 14).

Heat is introduced to the sample to dramatically increase the stability and can be used to alter the color. Both the temperature and the duration of heating affect the stability and color of the final paint composition. Heating may be done in an oven, or by other means of raising the temperature to the desired setting. The temperature should be between 100° C. and 300° C. as the paint composition starts to decompose above this point. More preferentially, the heating temperature should be between 100° C. and 200° C. or between 115° C. and 150° C. The duration the sample is heated can also be varied, depending upon the requirements for the particular application. The heat may be applied for up to several hours, 1 day, 2 days, 3 days or up to 4 days.

The paint composition produced in this manner is resistant to decomposition by light. This means that, when exposed to strong sunlight or other light sources as is common for painted surfaces, the composition will not noticeably change in color and the intensity, as measured by IR spectroscopy or x-ray diffraction, and will not decrease more than 10% over a 1 year period. The composition is also resistant to decomposition by acids, alkalis, and solvents. When exposed to acidic or basic solutions, the composition will not noticeably change in color and the intensity, as measured by IR spectroscopy or x-ray diffraction, will not decrease more than 10% over a 1 year period.

V. General Method for Producing Color Composition

The general method for producing a color composition comprises of (a) providing a molecular derivative of indigo or any cationic organic dye or cationic pigment. The derivative of indigo can be selected from any indigo derivative shown in Scheme 1. The amount of dye or pigment used can be in the range of 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, 1.0%, 2.0%, 3.0%, 4.0%, 5.0%, 6.0%, 7.0%, 8.0%, 9.0%, 10.0%, 11.0%, 12.0%, 13.0%, 14.0%, 15.0%, 16.0%, 19.0%, or 20.0% by weight or more preferably 0.1% to 7% by weight or ideally at about 6% by weight.

The next step (b) can consist of combining the molecular derivative of indigo with an appropriate weight of fibrous clay, such as a palygorskite clay, a sepiolite clay, or a mixture of a palygorskite and a sepiolite clay, or a layered clay, such as a kaolinite, bentonite, nontronite, or mordenite clay to form a color composition. Step (b) further comprises the grinding of the dye or pigment with the layered or fibrous clay which can be carried out in, but not limited to, a blender, industrial blender, industrial mixer, shear blender, or a precise solid state blender. The clay and the dye may be ground separately and then ground together or they may be combined and ground to both mix the two components in order to obtain the preferred particle size. If the clay is already at the preferred size, the clay and indigo may be mixed together without grinding. Techniques for grinding and blending the dye and clay compositions are found in *Mixing of Solids* (32), *Powder and Bulk Solids Handling Processes* (6), or *Bulk Solids Mixing* (5). De-ionized water may be added during blending to attain a homogenized mixture. The clay or clay mixture should be ground to obtain particles of between about 0.005 µm and 50 µm, 0.01 µm and 20 µm, 0.05 µm and 10 µm, or more particularly between about 0.1 µm and 2 µm. A range of particles sizes is expected, but over 60% or over 80% or over 90% or over 95% or over 99% of the particles should be the desired size. For example, when the particles are ground to about 2.0 µm, 80% of the particles should be between 1.7 µm and 2.3 µm.

The next step comprises (c) heating the color composition. The heating may comprise heating at a temperature of 100° C., 110° C., 115° C., 120° C., 125° C., 130° C., 135° C., 140° C., 145° C., 150° C., 155° C., 160° C., 165° C., 170° C., 175° C., 180° C., 185° C., 190° C., 195° C., 200° C., 205° C., 210° C., 215° C., 220° C., 225° C., 230° C., 235° C., 240° C., 245° C., 250° C., 255° C., 260° C., 265° C., 270° C., 275° C., 280° C., 285° C., 290° C., 295° C. or 300° C., or more particularly between 115° C. and 150° C. The heating may be for several hours, 1 day, 2 days, 3 days, or may last up to four days. The heating can be carried out in, but not limited to, a batch oven, a drying oven, an infrared oven, or a powder coating oven.

Next the pH of the color composition may be adjusted to an acidic or neutral pH, depending on the final color desired. Exemplary examples of the acid used to adjust the pH comprise: any protonic acid, $H_2SO_4$, $HClO_4$, $HClO_3$, $H_3PO_4$, $HNO3$, $HCN$, $HF$, $HBr$, $HI$, $H_3O^+$, or $CH_3COOH$, or more preferably HCl. Exemplary examples of the base used to adjust the pH comprise: LiOH, NaOH, KOH, RbOH, CsOH, $Ca(OH)_2$, $Sr(OH)_2$, $Ba(OH)_2$ or more preferably NaOH. The pH of the color composition can be 1, 2, 3, 4, 5, 6, 7, 8, 9, 10, 11, or 12. The pH of the system can be monitored with a pH meter that is calibrated with buffers of pH 1, 2, 3, 4, 5, 6, 7, 8, 9, 10, 11, or 12.

Additional steps in making the color composition may comprise: treating the color composition with acid such as but not limited to any protonic acid, $H_2SO_4$, $HClO_4$, $HClO_3$, $H_3PO_4$, $HNO_3$, $HCN$, $HF$, $HBr$, $HI$, $H_3O^+$, or $CH_3COOH$, or more preferably HCl, to remove impurities from the clay; applying the color composition to a surface; blending the color composition with a polymer, plastic or organic binder as discussed in *Encyclopedia of Polymer Science and Engineering*, $2^{nd}$ ed. (11) and *Paint and Surface Coatings: Theory and Practice*, $2^{nd}$ ed. (8).

The following patents are included as examples to demonstrate certain embodiments of the invention. However, those of skill in the art should, in light of the present disclosure, appreciate that many changes can be made in the specific embodiments which are disclosed and still obtain a like or similar result without departing from the spirit and scope of the invention. U.S. Pat. No. 3,950,180 covers the method of manufacturing color compositions that include zeolite and montmorillonite. U.S. Pat. No. 5,061,290 covers the method of using indigo derivatives as a dyeing agent. U.S. Pat. No. 4,246,036 covers the method of manufacturing color compositions that are comprised of asbestos-cement. U.S. Pat. No. 4,640,862 covers color compositions that are used for coating an expanded polystyrene "drop-out" ceiling tile. U.S. Pat. No. 4,868,018 covers color compositions that are used with a mixture of epoxy resin, epoxy resin hardener, and portland cement to form a coating which can be applied to a surface to form simulated marble products. U.S. Pat. No. 4,874,433 covers a method for encapsulating color compositions in and/or to a zeolite. U.S. Pat. No. 5,574,081 covers a method of manufacturing waterborne clay-containing emulsion paints with improved application performance using color compositions. U.S. Pat. No. 5,972,049 covers the method of manufacturing and using color compositions to form dye carriers used in the dyeing process for hydrophobic textiles. U.S. Pat. No. 5,993,920 covers the method of manufacturing and using color compositions with stone powder and/or cement powder, fine sawdust and/or the heart of a kaoliang stalk and other materials to form an incombustible artificial marble. U.S. Pat. No. 6,339,084 covers the method of manufacturing thiazine-indigo pigments. U.S. Pat. No. 6,402,826 covers the method and manufacturing of color compositions for paper coating.

As used herein, the term "organic/inorganic complex" refers to a complexation of one or more organic molecules with one or more inorganic molecules. As used herein the term "color composition" refers to a pigment or dye complexed to a fibrous or a layered clay. As used herein, the term "coating composition" is synonymous with "color composition" and "paint powder". As used herein, the term "cement" refers to Portland cement types I, II, III, IV, IA, IIA, IIIA or as covered in *The Chemistry of Portland Cement*, $2^{nd}$ ed. (2); or any cement type discussed in the Dictionary of Cement Manufacture & Technology Zement Woerterbuch (1). The chemistry of cements use in the present invention is covered in *The Chemistry of Cements*, $2^{nd}$ volume (29). As used herein, the term clay refers to a fibrous clay, such as, but not limited to, a palygorskite or a sepiolite clay or a layered clay, such as, but not limited to, kaolinite, bentonite, nontronite, or mordenite clay.

As used herein, the term "about" means within 25% of the stated value, or more preferentially within 15% of the value. As used herein the specification, "a" or "an" may mean one or more. As used herein in the claim(s), when used in conjunction with the word "comprising", the words "a" or "an" may mean one or more than one. As used herein "another" may mean at least a second or more.

VI. Examples

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Prophetic Example 1

Indigo Derivatives Concentration Experiments

A 0.05 g sample of indigo derivatives (from BASF) was suspended in ~50 ml of water. Sodium hydrosulfite, 0.03 g, and 15 drops of 1 M NaOH were added to the solution to reduce the indigo derivative. The solution was heated to 90° C. while stirring with a magnetic stirrer. The solution remained blue, at which point an additional 0.1 g of sodium hydrosulfite was added. The solution turned clear indicating that the indigo derivative had been reduced and was now soluble. The leucoindigo derivative was then poured over 5 g of palygorskite clay, and was stirred. Immediately upon contact with the clay and being exposed to air, the solution turned dark blue. The solution was placed in the oven at 125° C. for four days, at which point it resembled the color of organic/inorganic complex. The hue was slightly lighter and less intense than that of original organic/inorganic complex; hence, a series of clay pigments were prepared with various concentrations to examine color differences as a function of the concentration of indigo derivative. Additionally, it was determined, as has been cited in the literature, that it was not necessary to reduce the indigo derivatives prior to blending it with the clay. Thus, the rest of the synthetic organic/inorganic complex samples were prepared without reducing the indigo derivatives first.

Preparing a series of organic/inorganic complex samples with varying concentrations was accomplished by grinding a 0.01 g, 0.02 g, 0.03 g, 0.04 g, and 0.05 g of indigo derivatives with 5.00 g of palygorskite clay, respectively. Each concentration series was then placed in a blender with 100 ml of de-ionized water and blended for several minutes to ensure that a homogenous mixture was obtained. The corresponding solutions were placed in a 250 ml beaker in the oven at 125° C. for four days. It was confirmed by I.R. that a blue color could also be produced simply by grinding the indigo derivative and clay without water, provided the two were subsequently heated. For later studies, the simplest method of grinding was employed.

Example 2 pH Experiments of Synthetic Organic/Inorganic Complex

Synthetic samples were prepared using either sodium hydroxide or sodium hydrochloride to prepare the samples in acidic or basic solution. For the pH studies, 0.1 g of indigo was ground with 5.0 g of clay four times to obtain four samples. To each ground mixture was added 100 ml DI water, and dropwise either 1 M NaOH, or 1 M HCl to obtain solutions with pH's of 4, 7, 9, and 11. The pH of the system was monitored with a pH meter that had been calibrated with buffers of pH 4, 7, and 11.

As shown in FIG. 1, the colors arranged horizontally, prepared with increasing concentrations of indigo, visually range from a pale bluish-green to a darker grayish blue-green. The variations of color seen in the vertical direction range from grayish blue-green under basic conditions to brighter, vibrant blues at neutral to acidic pH. Visually, the organic/inorganic complex prepared with the highest percentage (2%) of indigo derivatives under neutral pH conditions was closest in resembling the 'authentic' organic/inorganic complex.

Example 3

Mixing of Organic/Inorganic Complex

Synthesis of organic/inorganic complex requires grinding or milling. It is known that under mechanical milling the fiber bundles can disaggregate and the ends become splayed. At the frayed ends, the bond strength of the tetrahedral layers is reduced such that the guest indigo molecule can enter the channel and pry apart the weaker layers to create a superlattice structure. Furthermore, as organic molecules interact with the clay surface there is a reorientation of the OH-groups which initiates the elastic deformation of the interlayer spacing, thus allowing penetration of the guest molecule. The inventors have solid state NMR and IR evidence of how the OH-groups on the palygorskite surface reorient during this process. This reorientation, or change in Si—O—Si bond angle is directly related to the adsorption of indigo derivative to the external surface.

Example 4

Temperature Study of Indigo/Palygorskite

Figure 3:
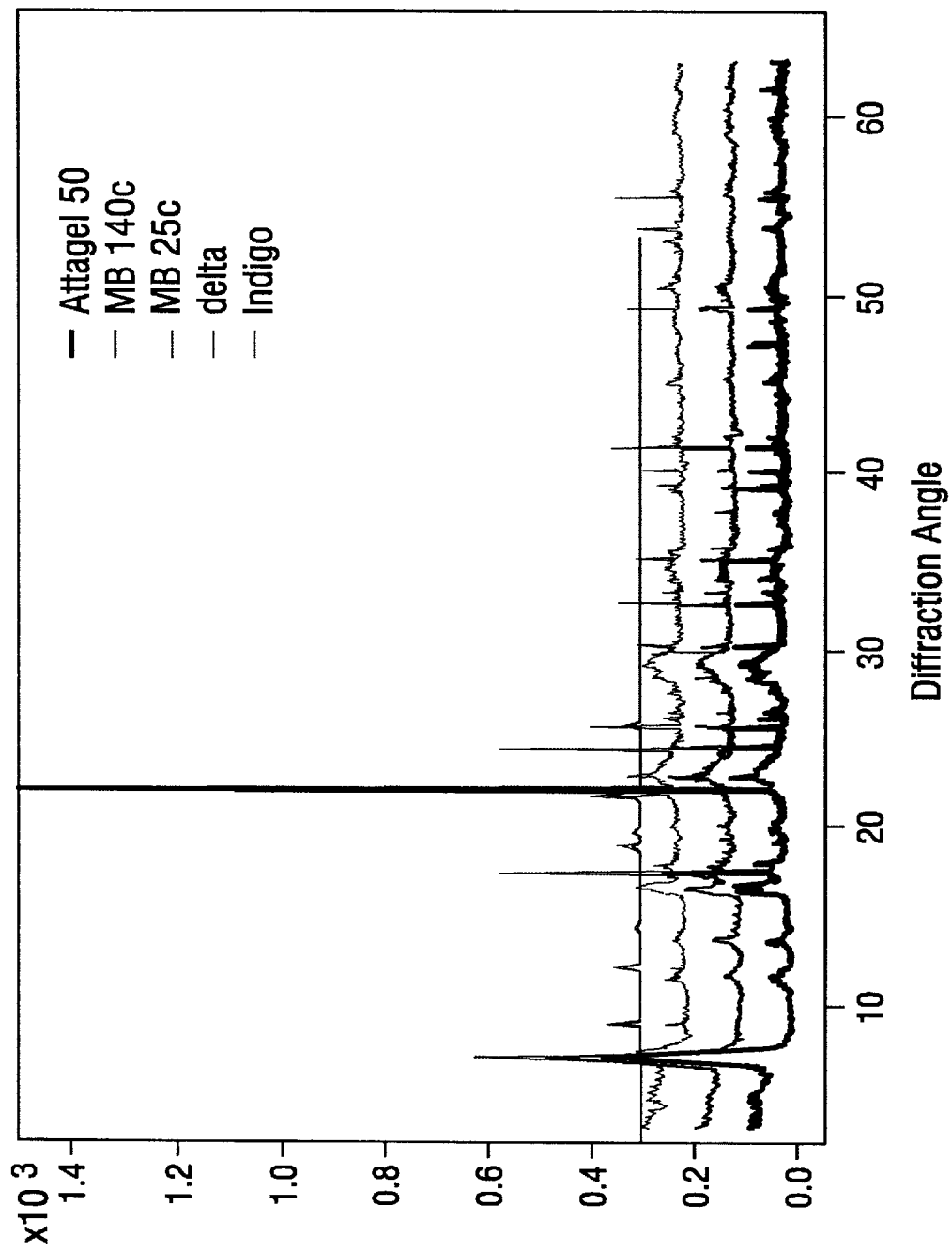
FIG. 3—Synchrotron X-ray Diffraction of Attagel (palygorskite) and organic/inorganic complex at 25° C. and 140° C. Simulated diffraction of Indigo derivatives are also shown.

One interesting observation is that one can visually see the gradual color changes of the clay/indigo mixture while it is heated in the oven. To monitor these color changes and consequently, monitor the chemical interaction, a synthetic organic/inorganic complex was made as previously described. During the process the reaction was stopped at various temperatures. Initially, 0.3 g of indigo derivative was blended with 4.7 g of palygorskite. One gram of this mixture was placed in a vial. The remaining sample mixture was heated for 24 hours at 100° C. at which point another gram was taken from the mixture and placed in a vial. The remaining mixture was heated an additional 24 hours at 140° C. and then placed in a vial for later analyses. The clay samples, at 25° C., 100° C., and 140° C. were analyzed using synchrotron x-ray diffraction, x-ray diffraction simulations and IR spectroscopy. A representation of the colors and hues of the starting materials and changes in the color and hue upon heating are shown in FIG. 3.

Example 5

Synchrotron X-Ray Diffraction of Synthetic Organic/Inorganic Complex

The palygorskite clay (Attagel) and organic/inorganic complex prepared at 25° C. and 140° C. were run at SSRL on beam line 2-1. The diffraction of indigo was simulated using Cerius 2. The resulting data were compared and are shown in FIG. 3. The diffraction pattern of the unheated mixture of clay and indigo (25° C.) still has peaks due to the crystalline phase of indigo. Once the clay and indigo are heated together to make the 140° C. sample, the indigo phase no longer gives diffraction peaks. Clearly, the crystal structure of indigo has been disrupted as a consequence of its binding to the clay surface.

Example 6

Particle Size Experiment Example

Two indigo derivative samples (0.05 g each) were separately ground in a blender with 4.7 g of palygorskite clay. One of the clay samples was 0.1 μm in size and the other was 2 μm in particle size. Each mixture was heated to 125° C. for three days. The sample prepared with the 2 μm particle size clay had a darker green hue. The sample prepared with the 0.1 μm size clay had a darker blue hue.

Example 7

Other Dye/Pigment Systems 0.05 g of thioindigo was ground with palygorskite and heated in the oven for three days at 125° C. A remarkable color change (from magenta red to royal blue) was observed during the heating process. Other dyes also may be used in this manner.

Example 8

Cationic Organic/Inorganic Complexes

Figure 4:
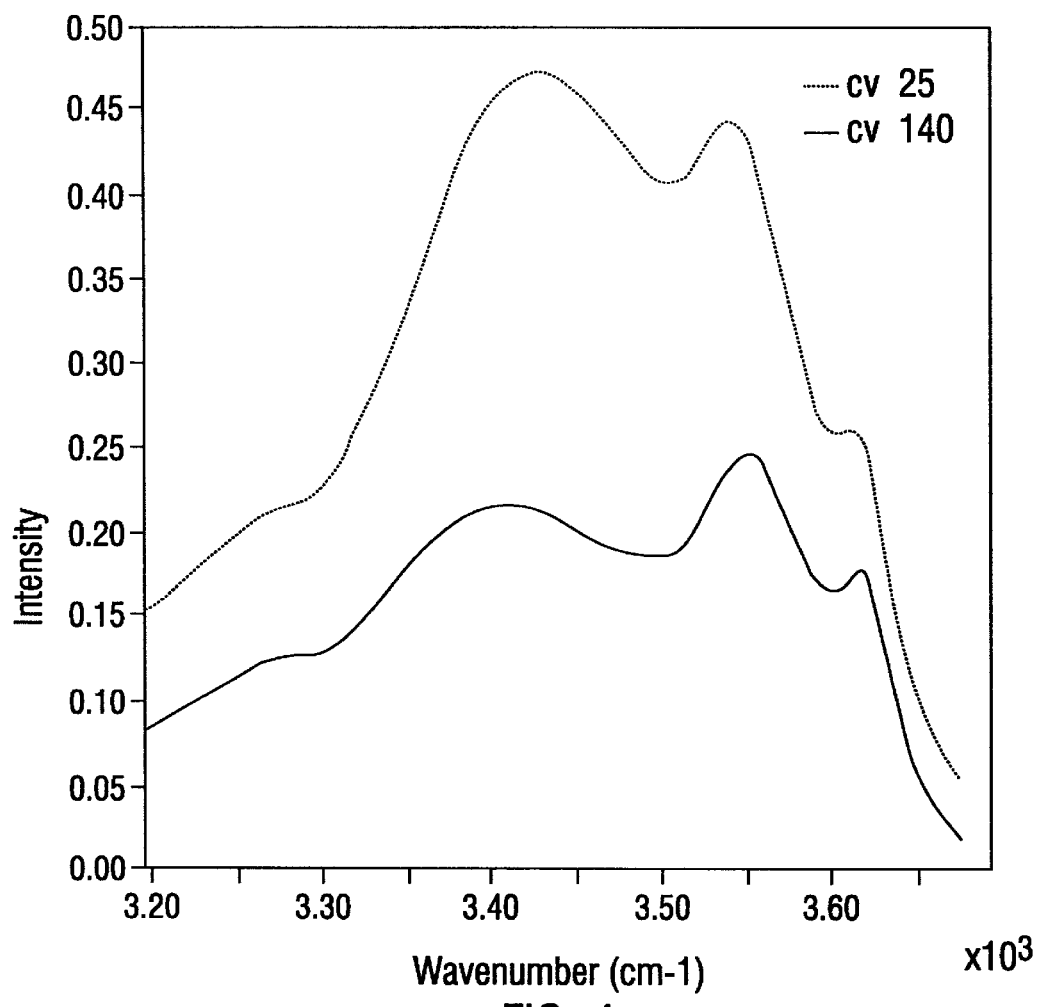
FIG. 4—IR Analysis of crystal violet mixed with palygorskite clay. Temperatures are room temperature (25° C.) and after heating and reaction at 140° C. The cationic exchange reaction with the clay does not produce a color change, and thus it does not chemically alter the IR spectra.
Figure 5:
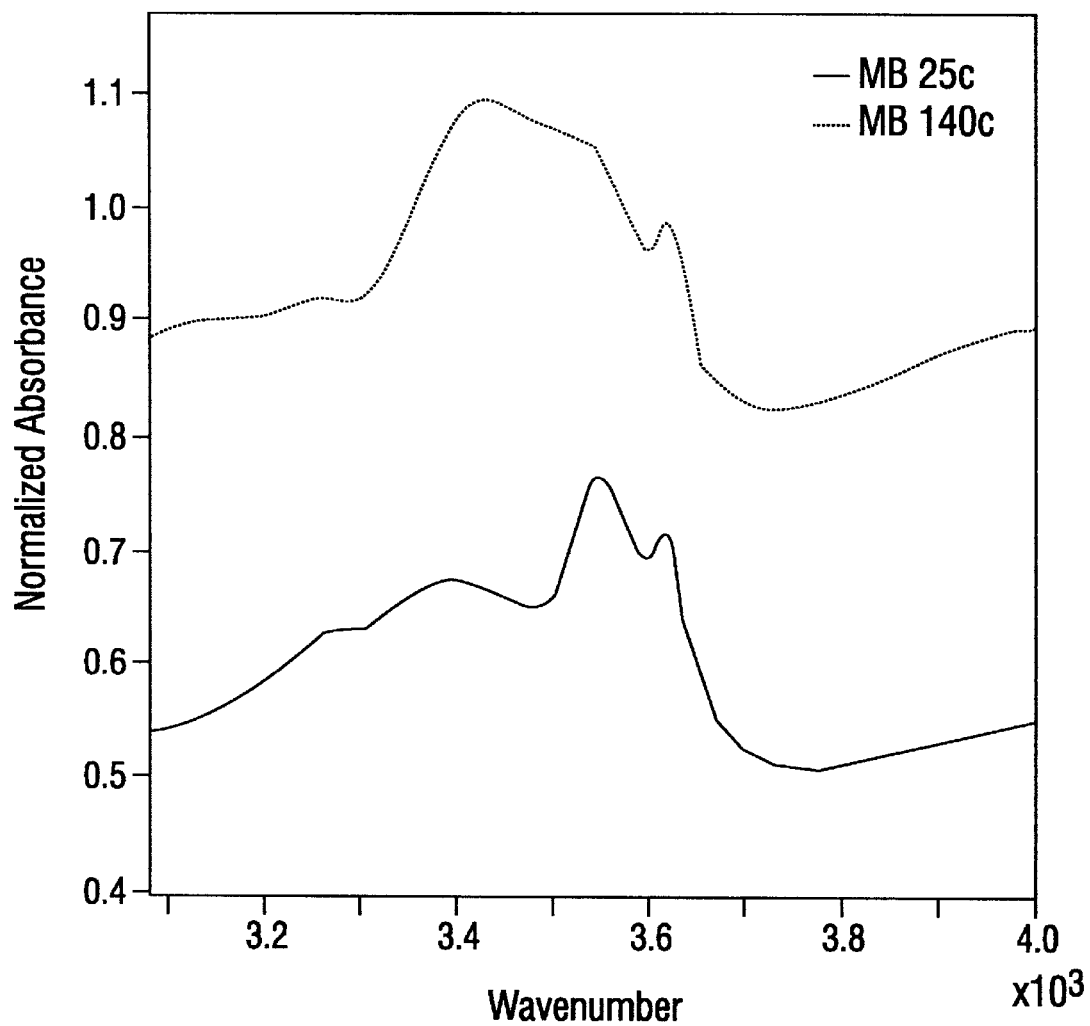
FIG. 5—IR Analysis of maya blue (indigo pigment mixed with palygorskite clay). One is at room temperature (25° C.), where there is no chemical reaction or color change when the indigo is merely mixed with the clay. After 140° C. heating and reaction of the mixture, the IR spectra clearly changes. The changes in the peaks are indicative of a new chemical interaction between the indigo and clay.

Several cationic dyes were reacted with the palygorskite clay. Each dye (0.1 g each) was separately ground in a blender with 4.9 g of palygorskite clay and 100 mL of water. The mixtures were then placed in the oven at 125oC until the water evaporated. The samples were ground in a mortar and pestle and then any excess dye that was not bound to the clay was extracted with water or an appropriate solvent. For the cationic complexes, no changes in color were observed because the binding mechanism does not involve electron charge transfer, as is the case with neutral molecules. Infrared analysis following excess dye extraction was used to analyze the final clay/cationic dye complex (FIGS. 4 and 5). The list of successfully employed cationic dyes includes crystal violet, aniline blue, methylene blue, victoria blue R, malachite green oxalate, methylene green, neutral red, quinoldine red, alphazurine A, janus green B, ethyl violet. The compounds have the general structure:

Clay Surface—$O^-H^+ + R^+X^-$ reacts to give: Clay surface—$O^-R^+ + H^+X^-$

All of the methods disclosed and claimed herein can be made and executed without undue experimentation in light of the present disclosure. While the compositions and methods of this invention have been described in terms of preferred embodiments, it will be apparent to those of skill in the art that variations may be applied to the methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference:

1. Amerongen, C. V. *Dictionary of Cement Manufacture & Technology Zement Woerterbuch* French & European Pubns., Oct. 1, 1986.
2. Bogue, R. H. *The Chemistry of Portland Cement*, 2d ed. New York: Reinhold Publishing Corp, 1955.
3. Gettens, R. J. *Amer. Antiquity* 27, 557–564, 1962.
4. Gettens, R. J., Stout, G. L. *Painting Materials: A Short Encyclopedia* D. van Nostrand, New York, N.Y., 1946.
5. Gyenis, J., Gyenis. J. *Bulk Solids Mixing* Imperial College Press, 1999.
6. Iinoya, K., Masuda, H., Watanabe, K. *Powder and Bulk Solids Handling Processes* Marcel Dekker, Jul. 1, 1988.
7. Josè-Yacamán, M., Rendón L., Arenas, J., Carmen, J., Puche, M. C. S. "Maya Blue Organic/inorganic Complex Paint: An Ancient Nanostructured Material" *Science* Vol. 273, 223–225, 1996.
8. Lambourne, R., Strivens, T. A. *Paint and Surface Coatings: Theory and Practice*, $2^{nd}$ ed. William Andrew, 1999.
9. Littman, E. R. *Amer. Antiquity* 45, 87–101, 1980.
10. Littman, E. R., *Amer. Antiquity* 47, 404–408, 1982.
11. Herman, M. F., *Encyclopedia of Polymer Science and Engineering*, $2^{nd}$ ed. John Wiley & Sons, 1990.
12. Mindess, S., and Young, J. F. *Concrete* Englewood Cliffs, N.J.: Prentice-Hall, Inc., 1981.
13. Olphen, Van H. *Science* 154, 645–646, 1966a.
14. Olphen, Van H. *American Antiquity* 645–646, 1966b.
15. U.S. Pat. No. 3,950,180
16. U.S. Pat. No. 5,061,290
17. U.S. Pat. No. 4,246,036
18. U.S. Pat. No. 4,640,862
19. U.S. Pat. No. 4,868,018
20. U.S. Pat. No. 4,874,433
21. U.S. Pat. No. 5,574,081
22. U.S. Pat. No. 5,972,049
23. U.S. Pat. No. 5,993,920
24. U.S. Pat. No. 6,339,084
25. U.S. Pat. No. 6,402,826
26. Ramachandran, V. S., and Feldman, R. F. *Cement Science, In Concrete Admixtures Handbook: Properties, science, and technology* Park Ridge, N.J.: Noyes Publications, 1–54, 1984.
27. *Scientific American Discovering Archaeology*, p.4, August 2000.

28. Shepard, A. O. *Amer. Antiquity* 27, 565–566, 1962.
29. Taylor, *The Chemistry of Cements*, 2 volumes, London: Academic Press W. F. W., ed. 1964.
30. Torres, L. *Maya Blue: How the Mayas Could Have Made the Pigment, Materials Research Society Symposium* Materials Research Society, 1988.
31. U.S. Department of Transportation, Federal Highway Administration, *Portland Cement Concrete Materials Manual* Report no. FHWA-Ed-89-006, Washington: FHWA, August, 1990.
32. Weinekotter, R., Gericke, H. *Mixing Of Solids* (Powder Technology Series, Number 12), Kluwer Academic Publishers, 2000.
33. Zollinger, H. *Color Chemistry*, $2^{nd}$ ed., John Wiley & Son, 1991.

What is claimed:

1. A coating composition comprising:
   a) a molecular derivative of indigo; and
   b) a fibrous or layered clay.
2. The coating composition of claim 1, wherein said coating composition has a color/hue that is determined by the concentration of said molecular derivative of indigo and a pH of said coating composition.
3. The coating composition of claim 1, wherein said coating composition has a particle size that is between 0.01 μm and 20 μm.
4. The coating composition of claim 3, wherein the particle size of said coating composition is between 0.1 μm and 2 μm.
5. The coating composition of claim 1, wherein said fibrous clay is a palygorskite clay, a sepiolite clay, or a mixture of a palygorskite and a sepiolite clay.
6. The coating composition of claim 1, wherein said layered clay is a kaolinite, bentonite, nontronite, or mordenite clay.
7. The coating composition of claim 1, wherein said molecular derivative of indigo is dibromoindigo or thioindigo.
8. The coating composition of claim 1, wherein the coating composition is a powder or a liquid.
9. The coating composition of claim 1, wherein said coating composition is resistant to decomposition by light.
10. The coating composition of claim 1, wherein said coating composition is resistant to decomposition by acids, alkalis, and solvents.
11. A composition comprising:

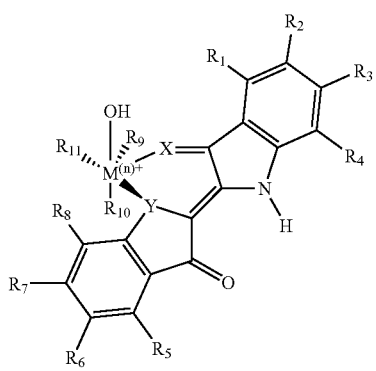

wherein:
$R_1$–$R_8$ are individually H, $CH_3$, $CH_2CH_3$, F, Cl, Br, I, CN, OH, SH, $OCH_3$ or $OCH_2CH_3$;
$R_9$–$R_{11}$ are individually $SiO_3$, SiOH or $H_2O$;
Y is N, O, S, or Se;
X is O or S;
$M^{(n+)}$ is Al, Sc, Ti, V, Cr, Mn, Fe, Co, Ni, Cu, Pt, Pd or Zn; and n is 1, 2, 3 or 4.

12. A formulation comprising:
   a) a molecular derivative of indigo;
   b) a palygorskite clay, a sepiolite clay, or a mixture of a palygorskite and a sepiolite clay;
   c) a polymer; and
   d) an organic binding agent.
13. A formulation comprising:
   a) a molecular derivative of indigo;
   b) a palygorskite clay, a sepiolite clay, or a mixture of a palygorskite and a sepiolite clay; and
   c) a gum arabic, a linseed oil, a copal, a polycarbonate, an egg tempura, or a turpentine.
14. A shapeable molding material comprising:
   a) a molecular derivative of indigo;
   b) a palygorskite clay, a sepiolite clay, or a mixture of a palygorskite and a sepiolite clay; and
   c) a cement, a plastics or a polymer.
15. A shapeable tile material comprising:
   a) a molecular derivative of indigo;
   b) a palygorskite clay, a sepiolite clay, or a mixture of a palygorskite and a sepiolite clay; and
   c) a cement, a plastic or a polymer.
16. A method of producing a coating composition comprising:
   a) obtaining a molecular derivative of indigo;
   b) combining said molecular derivative of indigo with a fibrous or layered clay to form a coating composition;
   c) heating said coating composition; and
   d) making a pH adjustment to the coating composition.
17. The method of claim 16, further comprising treating said coating composition with acid to remove impurities from the clay.
18. The method of claim 16, further comprising applying said coating composition to a surface.
19. The method of claim 16, further comprising blending said coating composition with a polymer or organic binder.
20. The method of claim 16, further comprising homogenizing said coating composition by blending, grinding, milling or stirring.
21. The method of claim 16, wherein said heating comprises heating at a temperature of between 100° C. and 300° C.
22. The method of claim 21, wherein the temperature is between 115° C. and 150° C.
23. The method of claim 16, wherein said heating lasts a maximum of four days.
24. The method of claim 16, wherein said coating composition contains water.
25. The method of claim 16, wherein said coating composition has a pH between 3 and 7.5.
26. The method of claim 16, wherein said coating composition contains said molecular derivative of indigo in the range of 0.01% to 20% by weight.
27. The method of claim 16, wherein said molecular derivative of indigo is in the range of 0.1% to 7% by weight.
28. The method of claim 16, wherein said coating composition contains a molecular derivative of indigo at about 6% by weight at neutral or acidic pH.
29. The method of claim 16, wherein said fibrous clay is a palygorskite clay, a sepiolite clay, or a mixture of a palygorskite and a sepiolite clay.

30. The method of claim 16, wherein said layered clay is a kaolinite, bentonite, nontronite, or mordenite clay.

31. The method of claim 16, wherein said coating composition has a particle size that is between 0.01 μm and 20 μm.

32. The method of claim 31, wherein the particle size of said coating composition is between 0.1 μm and 2 μm.

33. The method of claim 16, wherein said molecular derivative of indigo is thioindigo or dibromoindigo.

34. The method of claim 16, further comprising adding a binding agent to said coating composition.

* * * * *